United States Patent Office 3,161,640
Patented Dec. 15, 1964

3,161,640
3,6-BIS(DILOWERALKYLAMINOANILINO)-PYRIDAZINES
Douglas I. Relyea, Pompton Plains, N.J., assignor to United States Rubber Company, New York, N.Y., a corporation of New Jersey
No Drawing. Original application Oct. 29, 1962, Ser. No. 233,877. Divided and this application July 24, 1964, Ser. No. 385,055
2 Claims. (Cl. 260—250)

This invention relates to new chemicals.

The chemicals of the present invention are 3,6-disubstituted pyridazines represented by the formula

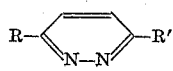

wherein R and R' are the same and are dialkylaminoanilino radicals. The alkyl groups in the dialkylaminoanilino radicals will generally have from 1 to 8 carbon atoms, e.g., methyl, ethyl, propyl, butyl, hexyl, octyl.

The chemicals of the present invention are prepared by reacting 3,6-dichloropyridazine, a known chemical, with the selected dialkylaminoaniline in an inert solvent, e.g., ethanol, xylene, toluene, benzene, pyridine, or dioxane.

The following examples illustrate the present invention.

Example 1

Preparation of 3,6-pyridazinebis(4-dimethylaminoaniline), or 3,6-di(p-dimethylaminoanilino) pyridazine.

A solution of 136 gm. (1.0 mole) of redistilled p-dimethylaminoaniline in 250 ml. of reagent pyridine was treated with 74.5 gm. (0.50 mole) of 3,6-dichloropyridazine. After approximately 20 minutes an exotherm to 80° occurred. The mixture was then allowed to stand over the weekend at room temperature. The reaction mixture which had set to a semi solid mass was broken up and washed thoroughly with water to remove the pyridine and pyridine hydrochloride. The residue was then dissolved in 500 ml. of water and 100 ml. of concentrated hydrochloric acid and the resultant dark brown solution filtered. The clear brown filtrate was run into 2.5 liters of water containing 80 gm. of sodium hydroxide and the dark yellow precipitate separated by filtration and dried at 50° C. and 50 mm. pressure. The product was recrystallized twice in 500 ml. of boiling o-dichlorobenzene, and filtered hot, resulting in 64 gm. of 3,6-pyridazinebis(4-dimethylaminoaniline), a yellow crystalline material, plate-like in structure, and having a melting point of 234°–236° C.

Analysis for $C_{20}H_{24}N_6$:

|           | Calculated | Found |
|-----------|------------|-------|
| Percent C | 68.94      | 68.56 |
| Percent H | 6.94       | 6.84  |
| Percent N | 24.12      | 23.99 |

The compounds of the present invention are useful as antioxidants for sulfur-vulcanizable rubbers, such as natural rubber as illustrated in the following example.

Example 2

Rubber stock A was compounded on a two-roll mill by mixing into 100 parts of Hevea rubber, 2 parts of stearic acid, 45 parts of HAF (high abrasion furnace) carbon black, 3 parts of zinc oxide, 6 parts of Paraflux softener (a saturated polymerized petroleum hydrocarbon having a specific gravity of 1.02 and a Saybolt Furol viscosity of 250–350 seconds at 140° F.), 2.75 parts of sulfur, 0.75 part of N-cyclohexyl-2-benzothiazolesulfenamide accelerator, and 2 parts of 3,6-pyridazinebis(4-dimethylaminoaniline). For comparison purposes, stock B was compounded similarly to stock A except there was incorporated in stock B a conventional commercial antioxidant combination, viz. 2.0 parts of BLE (a high temperature reaction product of diphenylamine and acetone having a specific gravity of 1.09) and 0.35 part of JZF (N,N'-diphenyl-p-phenylenediamine) instead of the 2 parts of 3,6-pyridazinebis(4-dimethylaminoaniline).

Specimens of stocks A and B were cured in a press for 30, 45 and 90 minutes at 293° F. and tested by the conventional testing methods used for rubber with results as shown in the following table:

| Physical Properties | Time of cure, minutes | A | B |
|---|---|---|---|
| Unaged: | | | |
| Tensile Strength (p.s.i.) | 30 | 3,810 | 3,860 |
|  | 45 | 3,610 | 3,910 |
|  | 90 | 3,720 | 3,510 |
| Elongation at Break (Percent) | 30 | 520 | 560 |
|  | 45 | 510 | 550 |
|  | 90 | 560 | 590 |
| Modulus at 300% (p.s.i.) | 30 | 1,750 | 1,500 |
|  | 45 | 1,700 | 1,475 |
|  | 90 | 1,450 | 1,200 |
| Aged—48 hrs. in Air at 212° F.: | | | |
| Tensile Strength (p.s.i.) | 30 | 3,010 | 2,590 |
|  | 45 | 2,890 | 2,520 |
|  | 90 | 2,730 | 1,890 |
| Elongation at Break (Percent) | 30 | 390 | 340 |
|  | 45 | 380 | 360 |
|  | 90 | 400 | 340 |
| Modulus at 300% (p.s.i.) | 30 | 2,275 | [1] 2,275 |
|  | 45 | 2,300 | [1] 2,200 |
|  | 90 | 2,000 | [1] 1,850 |
| Aged—72 hrs. in Air at 212° F.: | | | |
| Tensile Strength (p.s.i.) | 30 | 2,410 | 1,470 |
|  | 45 | 2,360 | 1,720 |
|  | 90 | 2,010 | 1,310 |
| Elongation at Break (Percent) | 30 | 330 | 250 |
|  | 45 | 340 | 270 |
|  | 90 | 310 | 250 |
| Modulus at 300% (p.s.i.)[1] | 30 | 2,300 | 2,100 |
|  | 45 | 2,250 | 2,100 |
|  | 90 | 2,050 | 1,925 |
| Aged—96 hrs. in $O_2$ Bomb: | | | |
| Tensile Strength (p.s.i.) | 30 | 3,080 | 2,940 |
|  | 45 | 2,810 | 2,690 |
|  | 90 | 2,270 | 2,260 |
| Elongation at Break (Percent) | 30 | 420 | 440 |
|  | 45 | 390 | 410 |
|  | 90 | 400 | 400 |
| Modulus at 300% (p.s.i.) | 30 | 2,070 | 1,750 |
|  | 45 | 1,850 | 1,650 |
|  | 90 | 1,510 | 1,500 |
| Aged—144 hrs. in $O_2$ Bomb: | | | |
| Tensile Strength (p.s.i.) | 30 | 3,125 | 2,805 |
|  | 45 | 2,515 | 2,485 |
|  | 90 | 1,870 | 2,095 |
| Elongation at Break (Percent) | 30 | 450 | 440 |
|  | 45 | 410 | 420 |
|  | 90 | 380 | 400 |
| Modulus at 300% (p.s.i.) | 30 | 2,010 | 1,700 |
|  | 45 | 1,750 | 1,625 |
|  | 90 | 1,350 | 1,450 |

[1] Extrapolated values.

The results show that a rubber stock containing the chemical of the present invention ages in air and an oxygen atmosphere equally as well as a similar rubber stock containing the conventional commercial antioxidant combination as measured by such physical properties as retention of tensile strength and degree of stiffness (modulus rise).

In view of the many changes and modifications that may be made without departing from the principles underlying the invention, reference should be made to the appended claims for an understanding of the scope of the protection afforded the invention.

This application is a division of my application Serial Number 233,877 filed October 29, 1962.

Having thus described my invention, what I claim and desire to protect by Letters Patent is:

1. A chemical represented by the formula

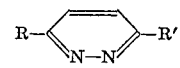

wherein R and R' are the same and are dialkylaminoanilino radicals in which the alkyl groups have 1 to 8 carbon atoms.

2. 3,6-pyridazinebis(4-dimethylaminoaniline).

No references cited.